(12) United States Patent
Beyert

(10) Patent No.: US 6,312,339 B1
(45) Date of Patent: Nov. 6, 2001

(54) SAFETY COUPLING

(75) Inventor: Thomas Beyert, Much (DE)

(73) Assignee: Martina Kuerten, Much (DE)

( * ) Notice: Subject to any disclaimer, the term of this patent is extended or adjusted under 35 U.S.C. 154(b) by 0 days.

(21) Appl. No.: 09/463,358

(22) PCT Filed: Jun. 25, 1998

(86) PCT No.: PCT/EP98/03895

§ 371 Date: Jan. 27, 2000

§ 102(e) Date: Jan. 27, 2000

(87) PCT Pub. No.: WO99/04933

PCT Pub. Date: Feb. 4, 1999

(30) Foreign Application Priority Data

Jul. 25, 1997 (DE) .......................................... 297 13 253 U

(51) Int. Cl.[7] ............................. F16D 7/08; F16D 43/206
(52) U.S. Cl. .............................. 464/30; 464/161; 464/36; 192/56.62
(58) Field of Search .............................. 192/56.62, 56.57; 464/30, 35, 36, 160, 161

(56) References Cited

U.S. PATENT DOCUMENTS

| | | | |
|---|---|---|---|
| 2,429,091 | * 10/1947 | Dodge et al. | .......................... 464/30 |
| 2,802,354 | * 8/1957 | Bohnhoff et al. | ....................... 464/36 |
| 2,806,366 | * 9/1957 | Woestemeyer | ..................... 192/56.62 |
| 2,875,601 | * 3/1959 | Georges | ................................... 464/36 |
| 3,034,365 | * 4/1962 | Stieber | .................................... 464/30 |
| 3,509,974 | * 5/1970 | Kampert et al. | ........................ 464/36 |
| 3,754,412 | * 8/1973 | Briggs | ..................................... 464/36 |
| 3,786,693 | * 1/1974 | Keipert | ................................... 464/36 |
| 3,942,337 | * 3/1976 | Leomard et al. | ........................ 464/36 |
| 4,294,340 | * 10/1981 | Kunze | .................................... 464/36 |

* cited by examiner

Primary Examiner—Lynne H. Browne
Assistant Examiner—Kenn Thompson
(74) Attorney, Agent, or Firm—Diller, Ramik & Wight

(57) ABSTRACT

The safety coupling comprises a housing (12) made up of a housing capsule (13) and a screwed-on housing cover (14). The torque is transmitted from the input shaft (10) via coupling disks (17, 18) to the output shaft (19). The first coupling disk (17) comprises rollers (23) rolling on a contoured coupling track (25) of the second coupling disk. The coupling track (25) is configured such that the rollers (23) are in exact line contact with the coupling track (25) over their length so that each roller (23) provides full support. Further, a locking device (33) is provided by means of which the turning position, to which the housing cover (14) has been adjusted for determinating the trip moment, can be locked.

10 Claims, 4 Drawing Sheets

SAFETY COUPLING

BACKGROUND OF THE INVENTION

The invention relates to a safety coupling comprising two coupling disks pressed against each other by a spring device, in particular for employment in screwing tools used for tightening a screw at a predetermined torque.

In DE 296 18 871 U a safety coupling in described which comprises two coupling disks accommodated in a housing. The coupling disks are provided with engaging profiles and are pressed against each other by a spring device. When the screwing resistance of a screw to be tightened is larger that the adjusted trip moment of the safety coupling, the profiles disengage so that the first coupling disk rotates. In this way the torque to be applied can be limited. However, the contiguous profiles of the two coupling disks cause friction which affect the trip moment in an unforeseeable way. On the one hand it must be taken into consideration that the static friction is larger than the sliding friction caused by displacement of the profiles, and further that the sliding friction may vary depending on the material and lubricant properties.

Further, safety couplings are known which comprise rolling bodies in the form of balls or rollers between the two coupling disks. However, balls are suitable only for low trip moments because of their point contact with the adjacent coupling disk since they do not withstand larger pressure forces or cause bulging-in of the coupling disk concerned. The rollers pose the problem that the rollers are aligned radially with the coupling disks and that the support along the inner radius does not conform to that on the outer radius. If the troughs of the coupling track have parallel boundary edges corresponding to the form of the cylindrical rollers, the boundary edges of the troughs do not extend radially to the respective coupling disk so that the roller leaves one end of the trough earlier than the other end. Consequently, the carrying capacity of the rollers can be utilized only up to a certain extent, and when a high load is applied the coupling track may be damaged and thus the torque residence time and accuracy adversely affected.

SUMMARY OF THE INVENTION

It is the object of the invention to create a safety coupling comprising elongate carrier bodies, where the trip moment can be adhered to with high accuracy due to uniform load distribution.

The coupling track of the safety coupling according to the invention is generally radially aligned with the coupling disk concerned. For cylindrical carrier bodies this means that the troughs of the coupling track do no have any parallel edges or margins or other boundaries. All contour lines extend radially so that no parallel contour lines exist. According to the invention the coupling track of the coupling disk is a path described by a carrier body radially aligned with the coupling disk having the same form and size as the carrier bodies, whereby the carrier body performs a periodical axial movement relative to the second coupling disk during a uniform rotation of the second coupling disk. This defines a possible production process of the coupling track. A coupling track suitable for cylindrical or partially cylindrical carrier bodies can be produced by means of a rotating cylindrical milling cutter axially aligned with the coupling disk, whose peripheral area processes the coupling track. The rotating milling cutter is moved axially to the coupling disk, e.g., by a sinusoidal reciprocating movement, while the coupling disk is uniformly rotated about its axis. The milling cutter then produces the desired contour of the coupling track. On said track the carrier bodies will later roll or slide, which have the same diameter as the milling cutter. When the carrier bodies leave the troughs, they rest against the coupling track along an exact radial line, i.e., they are in line contact. Thus, the carrier body provides support and is supported, respectively, over its overall length and a uniform load distribution is achieved. The fact that the contact line is exclusively radially aligned with the coupling disk results in a defined rolling or sliding movement, as well as a defined tripping of the safety coupling when the carrier bodies have reached the apex areas of the coupling track.

With regard to a coupling track for cylindrical carrier bodies it must be noted that the areas of the coupling track cooperating with the carrier bodies do not come too close to the axis of the coupling disk since this would prevent the line contact from being maintained until the apex of the coupling track has been reached. Therefore, the inner (smaller) radius of the coupling track must be so large that the track has the same height at its inner radius as at its outer radius.

The safety coupling according to the invention is particularly suitable for heavy loads. This means that it is of relatively small size and light weight for a given load or a given trip moment.

Preferably the contour of the coupling track is approximately sinusoidal on the outer radius. Thus, a good rolling behavior is achieved. The apexes of the sine shape may however also be flattened.

The carrier bodies with cylindrical surface may either be rollers which are rotatable relatively to the two coupling disks and thus roll on the coupling track, or cylindrical bodies which are integrally moulded to one of the coupling disks. The surface of the carrier bodies must be of cylindrical configuration only in the area cooperating with the coupling track. Alternatively, it is also possible to use conical carrier bodies or other carrier bodies whose surface is produced by rotation of a straight line.

It is also possible to provide each of the two coupling disks with a coupling track of varying height. In this case the coupling bodies are rollers guided in a roller cage. The advantage of such a configuration is that the fully cylindrical carrier bodies may roll on the coupling tracks of both coupling disks without any sliding friction occurring. This results in a small degree of wear and a high accuracy of the trip moment.

If the carrier bodies are configured as cylindrical rollers, two (or more) cylindrical rollers may be provided instead of a single cylindrical roller with the two (or more) cylindrical rollers being axially aligned with each other. This improves compensation for the speed difference between the inner and outer portions of the coupling track since the external cylindrical rollers may have a larger peripheral speed than the internal cylindrical rollers.

The invention further relates to a safety coupling for which the trip moment is adjustable by relative movement of two housing parts. The safety coupling according to DE 296 18 815 U comprises a housing capsule and a housing cover screwed onto the former. By turning the housing cover relatively to the housing capsule the tension of the spring device can be changed thus allowing the trip moment to be adjusted.

The invention is designed to ensure exact adherence to the adjusted trip moment of a safety coupling.

For this purpose the invention provides a releasable locking device which retains the housing cover in its adjusted screwed-on position.

The invention proceeds from the idea that tripping of the safety coupling produces impacts which may lead to unintentional twisting of the housing cover relative on the housing capsule. The fact that the housing cover must be capable of being manually turned for adjusting the desired trip moment offers another possibility of unintensional twisting. This requires the housing cover to be capable of being smoothly turned, which has the effect that unintentional twisting may occur. The locking device according to the invention helps to reliably maintain an adjusted position.

According to a preferred embodiment of the invention the locking device comprises a catch element shiftable along the housing cover, which engages with the internal toothing of the housing capsule. The internal toothing extending over a certain length of the housing capsule allows the catch element to engage in different axial positions of the housing capsule and in different turning positions to carry out the locking process.

Hereunder embodiments of the invention are explained in detail with reference to the drawings in which:

DESCRIPTION OF THE PREFERRED EMBODIMENTS

Figure 1:
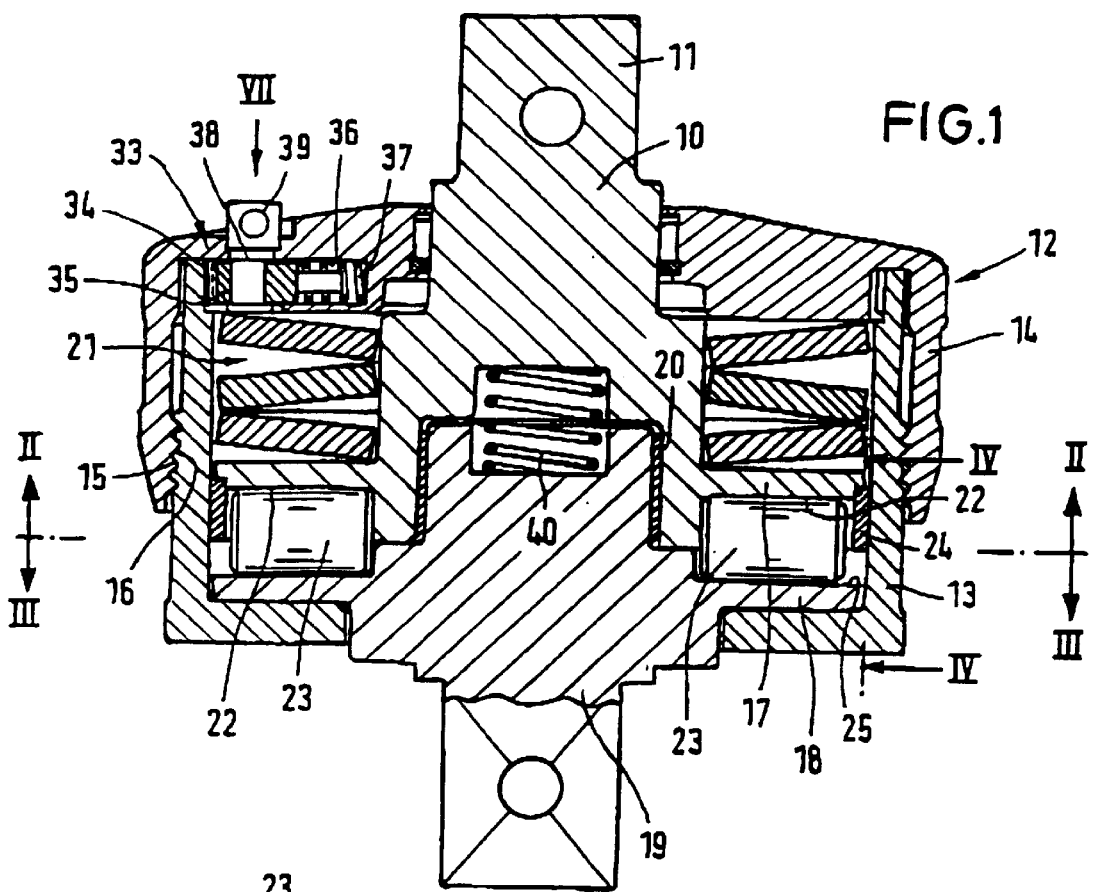
FIG. 1 shows a longitudinal section of a first embodiment of the safety coupling.
Figure 2:
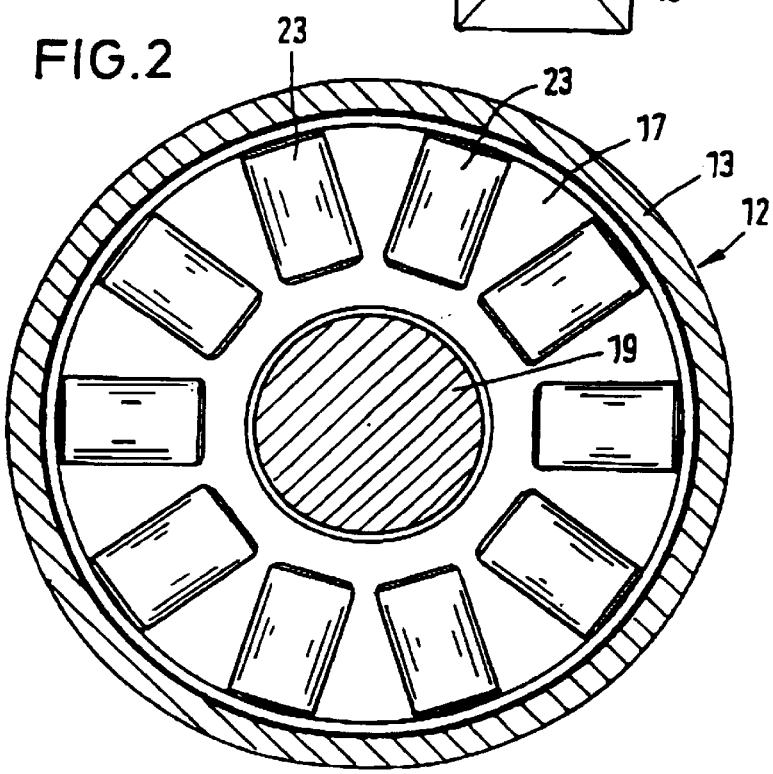
FIG. 2 shows a section along line II—II of FIG. 1.

The safety coupling of FIGS. 1 to 9 comprises an input shaft 10 to which a screwing tool in the form of a power screw driver or a manual screw driver can be fitted. For this purpose the input shaft is provided with a square 11. The input shaft 10 is supported in a housing 12 comprising a cupshaped housing capsule 13 and a cup-shaped housing cover 14. The female thread 15 of the housing cover 14 is screwed onto the male thread 16 of the housing capsule 13.

The housing 12 contains a first coupling disk 17 which is permanently attached to the input shaft 10, and a second coupling disk 18 which is permanently attached to an output shaft 19. The first coupling disk 17 is provided with a recess in which a ring-type sliding bearing 20 for supporting the output shaft 19 is arranged. The output shaft 19 extends through an opening in the bottom of the housing capsule 13 and the second coupling disk 18 is supported on the bottom of the housing capsule 13. Due to the friction between the second housing disk 18 and the bottom of the housing capsule 13 the housing 12 is rotated together with the output shaft 19 during the rotation process.

The housing 12 further contains a spring device 21 comprising a disk spring pack. Said spring device 21 is supported on the housing cover 14 and presses the first housing disk 17 towards the second housing disk 18.

Figure 4:
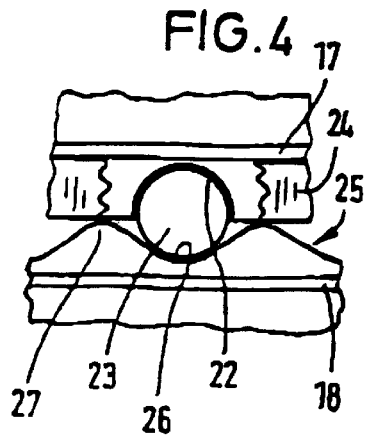
FIG. 4 shows a section along line IV—IV of FIG. 1.
Figure 3:
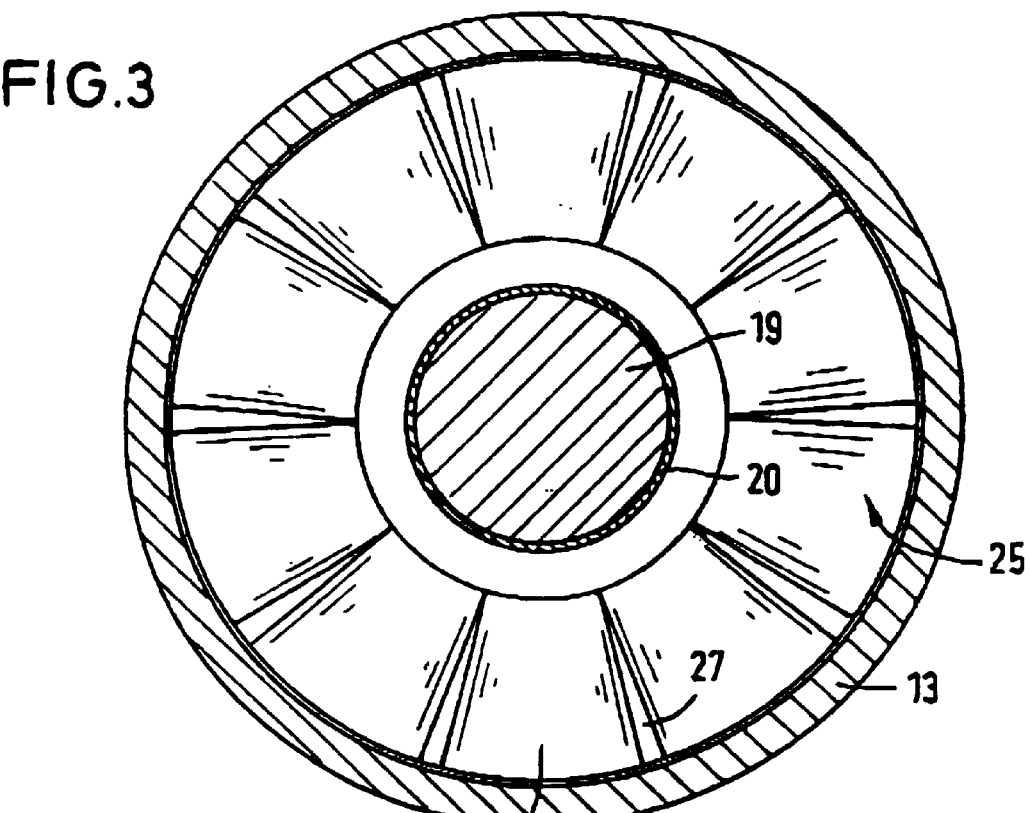
FIG. 3 shows a section along line III—III of FIG. 1.
Figure 5:
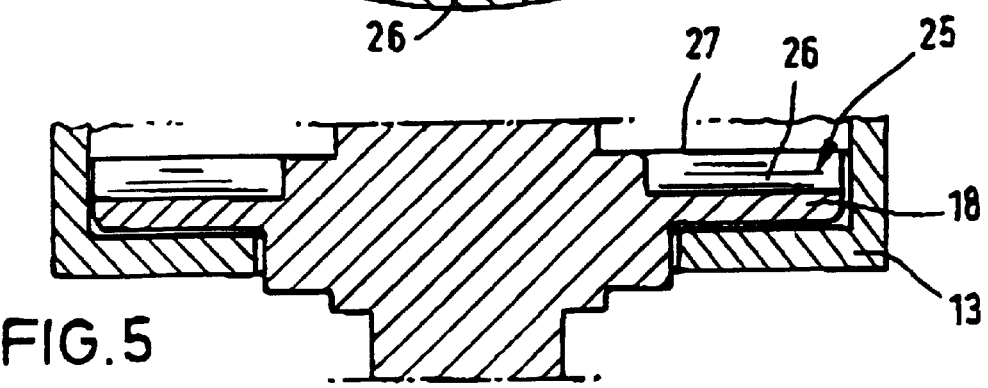
FIG. 5 shows an axial section of the second coupling disk.

The first housing disk 17 comprises at its front surface facing the second housing disk 18 nests 22 for accommodating cylindrical carrier bodies 23 which are configured here as rotatable cylindrical rollers. Said nests 22 are radial bores which do not have a closed periphery and extend over a periphery of slightly more than 180° as can be seen in FIG. 4. The roller 23 can be inserted in axial direction into the nest 22. The rollers are then secured against falling-out by a ring 24 which is laid around the coupling disk 17. The cylindrical rollers 23 are radially aligned with the coupling disk 17 as can be seen in particular in FIG. 2. Part of their periphery projects from the front surface of the coupling disk 17. The coupling disk 17 thus forms a roller cage. Each nest 22 is of partially cylindrical configuration and has a diameter which allows the roller 23 to rotate about its axis in the nest 22.

The front surface of the second coupling disk 18 facing the first coupling disk 17 comprises a circular coupling track 25 on which the rollers 23 perform a rolling movement. Said coupling track 25 is provided with a number of troughs 26 and crests 27 corresponding to the number of rollers 23. The crests and troughs form a sinusoidal line along the outer radius of the coupling rack 25. Along the inner radius of the coupling track 25, the troughs 26 are wider than the crests 27.

Figure 6:
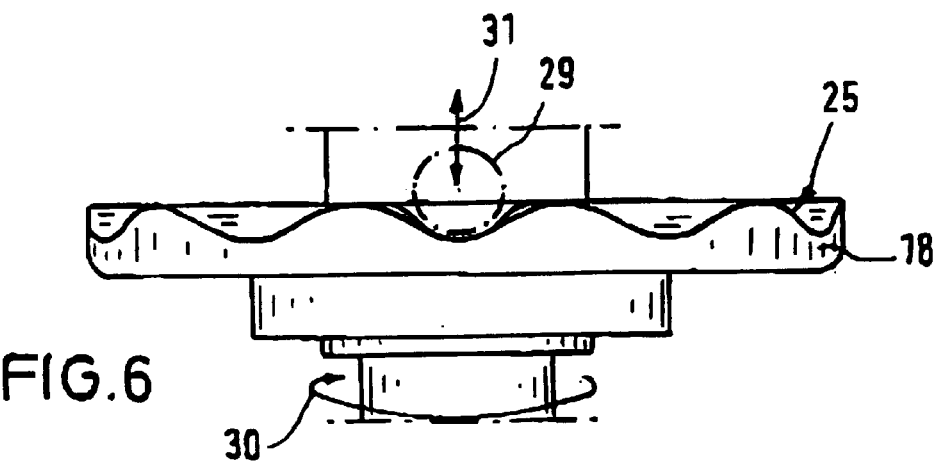
FIG. 6 shows a schematic represention of the production of the coupling track.
Figure 7:
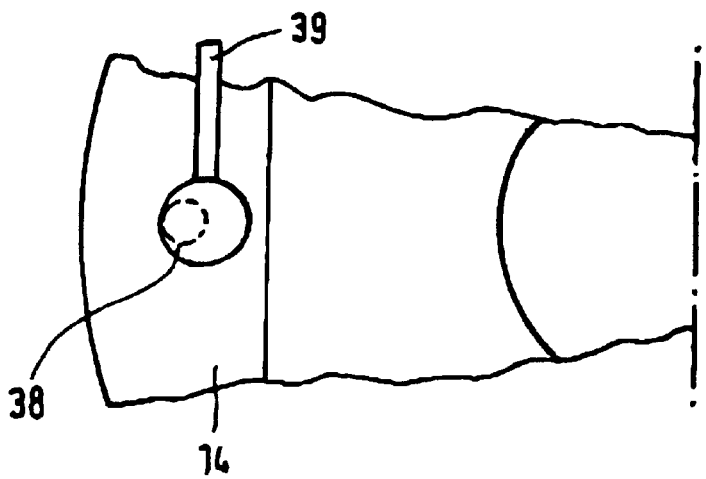
FIG. 7 shows a partial top view in the direction of arrow VII of FIG. 1.
Figure 8:
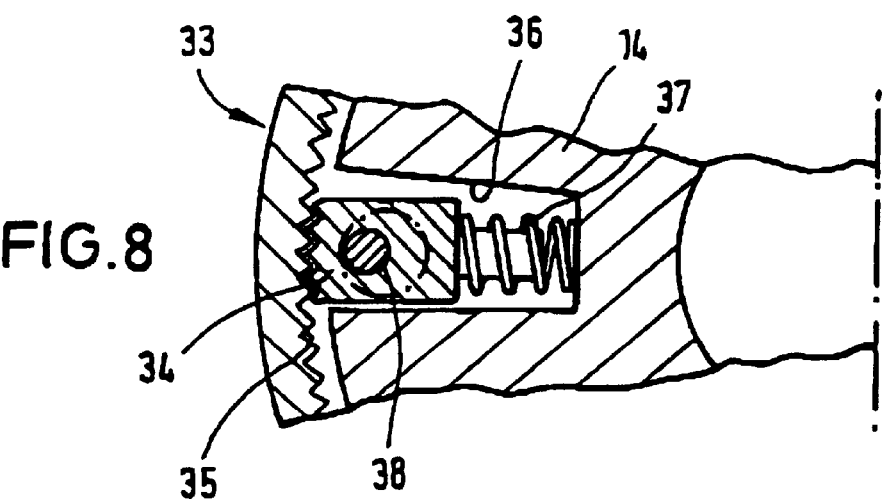
FIG. 8 shows a section of the locking device in locked condition.
Figure 9:
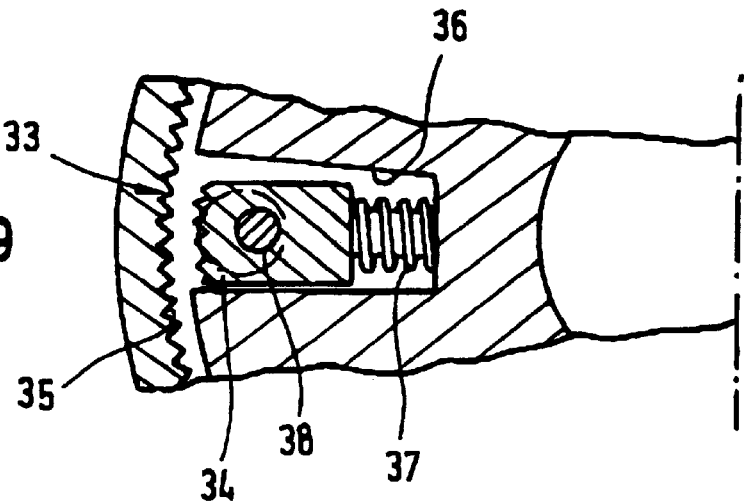
FIG. 9 shows the same representation of the locking device as FIG. 8 but in unlocked condition.

As can be seen in FIG. 6 the coupling track 25 is a path described by a cylinder 29 having the same diameter as the rollers 23 and being axially aligned with the second coupling disk 18, which performs a periodical axial movement (bidirectional arrow 31) relative the the second coupling disk 18 during a uniform rotation of the second coupling disk 18 (direction indicated by arrow 30). The path is the envelope described by the cylinder 29 on the coupling disk 18. Said envelope is produced when the cylinder 29 is e. g. a milling cutter rotating about its axis. However, if such a milling cutter would project inwardly to an excessive extent (towards the axis of the output shaft 19), its inner portion would remove the crests separating two troughs before its lower side has been raised to the corresponding height. Therefore the cylinder 29 is allowed to approach the axis only to such an extent that the coupling track 25 presents at its inner radius the same height as at the outer radius. In the same way as the cylinder or milling cutter 29 produces the coupling track 25 the rollers 23 later roll on said coupling track 25. Each roller 23 comes into exact line contact with the coupling track 25 at each location of the coupling track. Said line contact extends over the overall length of the roller 23.

By coupling track 25 only that strip is meant which is touched by the rollers 23. The contour of the coupling track may continue to the inside, however the continued areas do no longer form part of the path.

When a torque acts upon the input shaft 10, the coupling disk 17 tends to entrain the coupling disk 18 via the rollers 23. If the load moment acting upon the output shaft 19 exceeds the adjusted coupling moment, the rotation of the coupling disk 18 lags behind with the rollers 23 rolling up the coupling track 25 towards the respective crest 27. Now the spring device 21 is compressed. If the troughs 27 are passed over by the rollers 23, this means that the safety coupling is tripped and the coupling disk 17 rotates while the coupling disk 18 stops. The trip moment of the safety coupling may thus be adjusted by tensioning the spring device 21.

The trip moment is adjusted by turning the housing cover 14 relatively to the housing capsule 13. If the coupling is tripped, axial impacts occur so that the coupling cover 14 may be unintensionally twisted which would result in a misadjustment of the trip moment. The blocking device 33 is designed to avoid such a misadjustment. Said blocking device 33 comprises a catch element 34 provided with a toothing. A mating toothing 35 is provided as internal toothing at the upper end of the housing capsule 13. The catch element 34 is radially guided in a recess 36 of the housing cover 14 and pressed to the outside by a spring 37. The catch element 34 is actuated by an eccentric 38 supported in the front wall of the housing cover 14 and comprising a lever 39 for turning purposes. By rotating the eccentric 38 the catch element 34 may either be set into the locking position shown in FIG. 8 or the release position shown in FIG. 9. The internal toothing 35 is long enough to be reached by the catch element in any position of the housing cover.

When the trip moment of the safety coupling is adjusted to the lowest possible value the spring device 21 is essentially untensioned to allow adjustment without large manual force being required. To prevent the coupling parts from rattling inside the coupling a spring 40 is provided which presses the two coupling disks 17, 18 apart and thus counteracts the spring device 21. The spring 40 is however very smooth so that its force does not affect that of the spring device 21.

Figure 10:
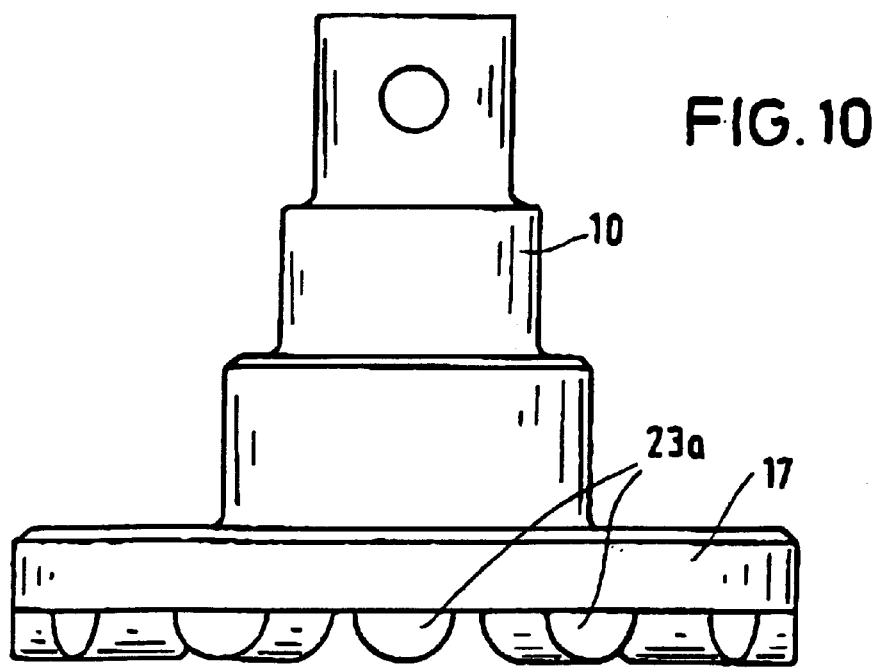
FIG. 10 shows another embodiment of a coupling disk with integrally moulded carrier bodies.

FIG. 10 shows another embodiment of the coupling disk 17. Here the carrier bodies are partially cylindrical projections 23a integrally moulded to the coupling disk 17. Said projections 23a cooperate with a second coupling disk 18 as in the first embodiment. Since the projections 23a are not capable of rotating about their axes, they slide along the coupling track 25.

Figure 11:
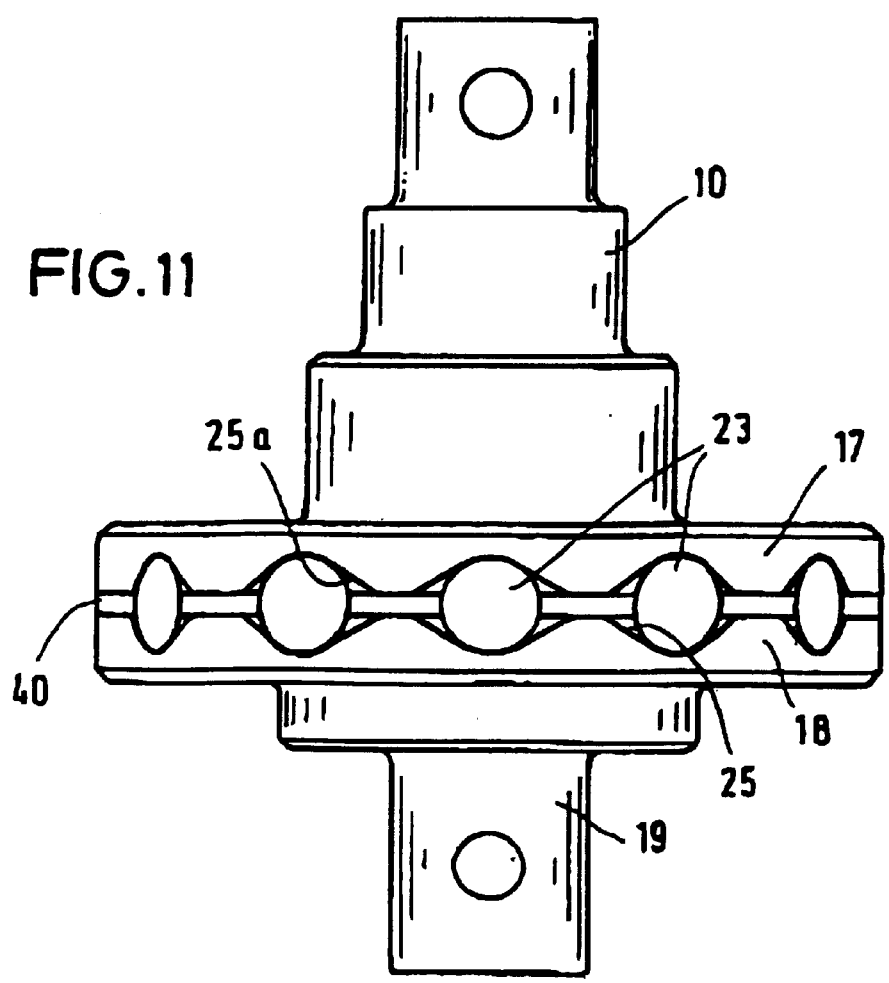
FIG. 11 shows a side view of an embodiment in which each of the coupling disks comprises a controlled coupling track.

In the embodiment of FIG. 11 only the input shaft 10 and the output shaft 19 with the two coupling disks 17, 18 are shown. The housing and the remaining parts are configured in the same way as in the first embodiment. FIG. 11 shows that the rollers 23 are guided in a roller cage 40 and are spaced from each other. The coupling disk 18 is provided with a coupling track 25 configured in the same way as that of the first embodiment. The coupling disk 17 is also provided with a corresponing coupling track 25a on its front surface with each roller 23 being seated, under normal conditions, in two opposite troughs of the coupling tracks 25 and 25a. The advantage of this embodiment is that due to the same profile of the two coupling tracks 25, 25a the same force couples acts from above and below upon the rollers 23. When the coupling disks are rotated relative to each other, the same distance is travelled along the rollers 23 owing to the fact that the same profile is provided. This results in the cylindrical rollers 23 rotating almost without producing any sliding friction.

Although a preferred embodiment of the invention has been specifically illustrated and described herein, it is to be understood that minor variations may be made in the apparatus without departing from the spirit and scope of the invention, as defined the appended claims.

What is claimed is:

1. A safety coupling comprising two coupling disks (17, 18) having a common axis wherein at least one of which has a coupling track (25) periodically varying in height, on which rollers (23) each having a single axis of rotation are provided between the coupling disks perform a rolling movement, a housing (12) surrounding the coupling disks (17, 18) and a spring device (21) supported on the housing (12) and pressing the coupling disks (17, 18) against each other, characterized in that the coupling track (25) is a path described by a reference body (29) having the same form, size and single axis of rotation as the rollers (23) and being radially aligned with the common axis of said coupling disks (17, 18), whereby the reference body (29) performs a periodical axial movement relative to the coupling disk during a uniform rotation of said coupling disk (18).

2. The safety coupling according to claim 1, characterized in that the contour of the coupling track (25) is approximately sinusoidal on the outer radius.

3. The safety coupling according to claim 1 tharacterized in that one of the coupling disks (17, 18) comprises nests (22) embracing by more than 180° the carrier bodies having the form of rotatable rollers (23).

4. The safety coupling according to claim 2 characterized in that one of the coupling disks (17, 18) comprises nests (22) embracing by more than 180° the carrier bodies having the form of rotatable rollers (23).

5. The safety coupling according to claim 1 characterized in that each of the coupling disks (17, 18) is provided with a coupling track and that the rollers (23) are guided in a roller cage.

6. The safety coupling according to claim 2 characterized in that each of the coupling disks (17, 18) is provided with a coupling track and that the rollers (23) are guided in a roller cage.

7. The safety coupling according to claim 1 characterized in that the coupling bodies form integral parts of a coupling disk.

8. The safety coupling according to claim 2 characterized in that the coupling bodies form integral parts of a coupling disk.

9. The safety coupling according to claim 1 characterized in that the outer radius of the coupling track (25) is of approximately twice the size of the inner radius.

10. The safety coupling according to claim 1 characterized in that diametrically opposite pairs of rollers are axially aligned.

* * * * *